(12) United States Patent
Satoh

(10) Patent No.: US 6,538,983 B1
(45) Date of Patent: Mar. 25, 2003

(54) OPTICAL DISK

(75) Inventor: Takeshi Satoh, Ichikaimachi (JP)

(73) Assignee: KAO Corporation, Tokyo (JP)

( * ) Notice: Subject to any disclaimer, the term of this patent is extended or adjusted under 35 U.S.C. 154(b) by 335 days.

(21) Appl. No.: 09/598,365

(22) Filed: Jun. 21, 2000

(51) Int. Cl.$^7$ ................................................ G11B 7/26
(52) U.S. Cl. ...................................................... 369/286
(58) Field of Search ............................... 369/286, 283, 369/272; 428/64.4

(56) References Cited

U.S. PATENT DOCUMENTS

| | | | | |
|---|---|---|---|---|
| 5,058,098 A | * | 10/1991 | Sakaue et al. ............... | 346/137 |
| 5,479,394 A | * | 12/1995 | Yashima et al. ............ | 369/272 |
| 5,719,850 A | * | 2/1998 | Yoshioka et al. ........... | 369/283 |
| 5,809,003 A | * | 9/1998 | Taira et al. ................ | 369/275.1 |
| 5,862,121 A | * | 1/1999 | Suzuki ...................... | 369/275.1 |
| 6,345,104 B1 | * | 2/2002 | Rhoads ....................... | 15/102 |

FOREIGN PATENT DOCUMENTS

| | | |
|---|---|---|
| JP | 6-055887 | 3/1994 |
| JP | 8-273201 | 10/1996 |
| JP | 9-081964 | 3/1997 |
| JP | 11-039723 | 2/1999 |

\* cited by examiner

*Primary Examiner*—David L. Ometz
*Assistant Examiner*—Angel Castro
(74) *Attorney, Agent, or Firm*—Oblon, Spivak, McClelland, Maier & Neustadt, P.C.

(57) ABSTRACT

The present invention relates to an optical disk which improves the visibility of visible information of a printed layer independently of the colors of a recording layer of a translucent reflective film. An optical disk is constructed by layering on the pits of a transparent disk substrate (1*a*), a recording layer (2*a*) of a translucent reflective film and a printed layer (4*a*) on which is printed visible information, with the visible information of the printed layer (4*a*) being visible from the disk substrate (1*a*) side of the disk. The color arrangement of the printed layer (4*a*) is selected such that the brightness difference between the lightest section and the darkest section on the viewed surface of the printed layer becomes 2.0 or above.

17 Claims, 1 Drawing Sheet

OPTICAL DISK

BACKGROUND OF THE INVENTION

1. Field of the Invention

The present invention relates to an optical disk comprising a printed layer on a signal readout surface side of the disk, for displaying material such as the content of the recorded information, and in particular relates to an optical disk facilitating the identification of visible information.

2. Description of the Related Art

In conventional optical disks, typically a printed layer is provided for displaying visual information such as figures and symbols so that the content of the recorded information can be readily understood.

For example, in the case of single sided recording reproduction type optical disks such as CDs (compact disks), a printed layer, which is formed by methods such as screen printing or offset printing, is provided onto the protective layer positioned on the disk surface reverse to the information signal readout surface, and hence almost the entire surface of the disk can be used for displaying figures and symbols.

In contrast, in the case of double sided recording reproduction type optical disks, onto which larger volumes of information are able to be recorded, the regions of the disk on which a printed layer can be provided are limited to those portions outside of the information recording regions such as the very narrow region close to the central portion of the disk, so as not to obstruct the readout of the information signal. Consequently the surface area which can be used for the display of figures and symbols has been very restricted.

In order to resolve the above problem, attempts have been made to enlarge the display area for visible information on double sided recording reproduction type optical disks, and examples include the inventions disclosed in Japanese Unexamined Patent Publication No. 9-81964, Japanese Unexamined Patent Publication No. 6-55887, and Japanese Unexamined Patent Publication No. 8-273201.

The inventions above comprise two optical disk base bodies each of which is formed by sequentially laminating an information signal layer of a translucent reflective film, a protective layer, and a printed layer onto an optical disk substrate, and which are then bonded together with the printed layers facing each other. Consequently, the information signal layer has a predetermined transparency, and the printed layer is visible from the disk substrate side of each disk base body which functions as the information signal readout surface, through the information signal layer and the protective layer.

With such a construction, a large surface area for the printing and display of figures and symbols can be ensured on both sides of the disk, without obstructing the readout of the information signal, even with double sided recording reproduction type optical disks.

Meantime, in those cases of viewing the visible information via the recording layer of the translucent reflective film by the naked eye, there can not be necessarily obtained excellent visibility, depending on the color arrangement of the printed layer. This is because, in viewing the printed layer on which is printed the visible information, through the recording layer of the translucent reflective film formed on pits based on signal information, it has become apparent that the visible light is attenuated on penetrating the translucent reflective film, hence, sufficient contrast of the dark/bright section is difficult, and due to projection resulting from reflection of the visible light from the translucent reflective film, and irregular reflections by the pits, the contrast of the dark/bright section decreases even further, and the translucent reflective film has its inherent color derived from the material and manufacturing method for this film.

SUMMARY OF THE INVENTION

The present invention takes the above factors into consideration, with an object of providing an optical disk capable of facilitating the visibility of visible information on a printed layer, by selecting such a color arrangement wherein the brightness difference between printed colors on the printed layer becomes 2.0 or above on the viewed surface of the printed layer.

Note, none of the aforementioned conventional technique have numerically referred to the color arrangement of printed colors on the printed layer.

In order to achieve the above object, an optical disk according to a first aspect of the present invention comprises a transparent disk substrate, a recording layer formed from a translucent reflective film which is layered on pits based on signal information provided on the disk substrate, and a printed layer which is layered on the recording layer and on which is printed visible information, and is constructed so that the visible information of the printed layer is visible from the disk substrate surface through the recording layer, wherein the printed colors of the printed layer are selected such that the brightness difference between the lightest section and the darkest section on the viewed surface of the printed layer becomes 2.0 or above.

According to such a constitution, when the printed layer is viewed from the disk substrate side, there can be sufficiently compensated for the attenuation of visible light on penetrating the recording layer of the translucent reflective film and the decrease of the contrast of the dark/bright section due to projection resulting from reflection of the visible light from the recording layer, and irregular reflections by the pits, to thereby allow the sufficient visibility of the visible information on the printed layer.

Furthermore, the optical disk of the present invention has a reflectance of 45%~55% relative to a reproduction light beam. By prescribing a reflectance relative to the reproduction light beam as 45% or above, as is prescribed in DVD standards, reproduction of optical disks using DVD players can be ensured. Moreover by setting the reflectance relative to the reproduction light beam to 55% or below, the visibility of the visible information on the printed layer can also be ensured.

In an optical disk disclosed in Japanese Unexamined Patent Publication No. 11-39723, because the sputtering time for the formation of an Au translucent reflective film was a relatively short 2.7 seconds, the reflective film was thin and the reflectance was low. Consequently, the reading precision of the information was lowered, making the disk unsuitable for use with DVD.

Furthermore, with the optical disk of the present invention, an optical buffer layer formed from a light transmissive material may also be provided between the recording layer and the printed layer.

According to the present invention, the material of the aforementioned recording layer may be selected from the group consisting of Au, an alloy incorporating Au, Cu, an alloy incorporating Cu, Si, an alloy incorporating Si as a main component, a compound of Si, and a mixture of Si and compound of Si.

According to the present invention, if the printed layer is constructed from a first printed layer for printing visible information, and a second printed layer for printing a background color for the visible information, then by selecting a suitable background color, the visibility of the visible information can be further improved. In such a case, if the second printed layer is formed by contact printing of a single color, then the printing process is relatively simple.

Furthermore, if the first printed layer and the second printed layer each have a thickness of 2 μm~30 μm, then not only is the visible information of the printed layer readily visible, but the effect by the printed layer on the electrical characteristics and the mechanical characteristics of the optical disk can also be kept to a minimum.

In order to apply the present invention to a double sided recording reproduction type optical disk, an optical disk in which the printed layer has the type of characteristics according to the first aspect of the invention may be used for at least one of a first optical disk and a second optical disk, with the first optical disk and the second optical disk then being bonded together with the respective substrates thereof facing outwards, thereby providing visible information on only one side of the double sided optical disk. Alternatively optical disks in which the printed layer has the type of characteristics according to the first aspect of the invention may be used for both a first optical disk and a second optical disk, with the two disks then being bonded together with the printed layers facing each other, thereby providing visible information on both sides of the double sided optical disk. In either case, if an opaque adhesive layer is provided between the first optical disk and the second optical disk to bond the two disks together, then the visibility of the visible information is able to be improved.

A double sided recording reproduction type optical disk of the present invention preferably has a reflectance of between 45%~55% relative to the reproduction light beam. Furthermore, an optical buffer layer formed from a light transmissive material may also be provided between the recording layer and the printed layer. Moreover, the printed layer may be constructed from a first printed layer for printing visible information, and a second printed layer for printing a background color for the visible information, with the second printed layer being formed by single color contact printing. In such cases preferably the first printed layer and the second printed layer each have a thickness of 2 μm~30 μm. Furthermore, the material of the recording layer may be selected from the group consisting of Au, Au alloy, Cu, Cu alloy, Si, an alloy incorporating Si as a main component, a compound of Si with either carbon or nitrogen, and a mixture of Si and compound of Si with either carbon or nitrogen.

DESCRIPTION OF THE PREFERRED EMBODIMENTS

Figure 1:
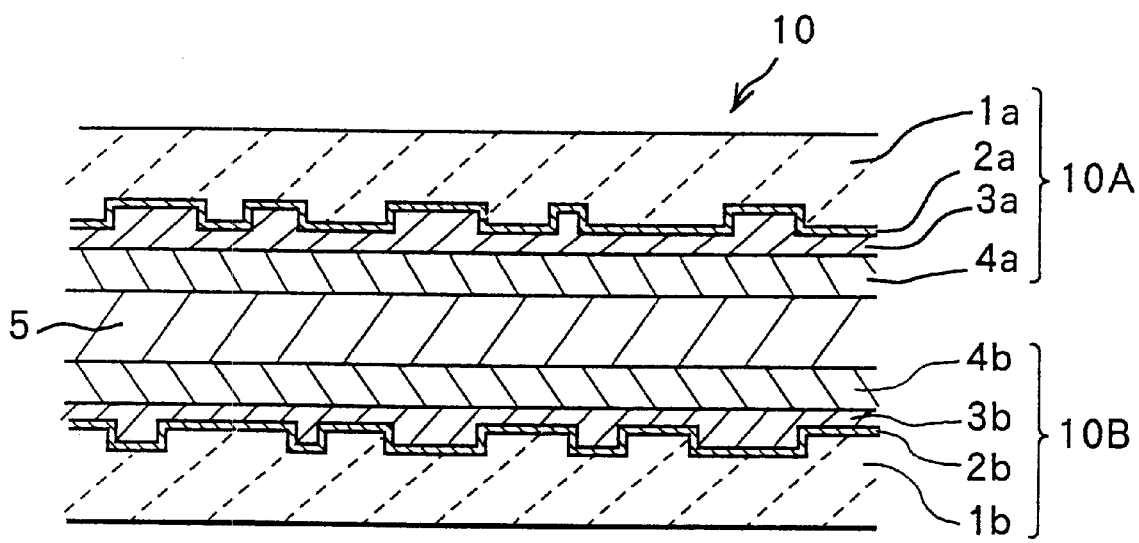
FIG. 1 is a longitudinal sectional view showing an embodiment of a construction of an optical disk of the present invention.

As follows is a description of a preferred embodiment of the present invention based on the drawings.

FIG. 1 is a longitudinal sectional view showing an example of a construction of an optical disk of the present invention.

In FIG. 1, a transparent, circular plate type disk substrate 1a is provided with grooves formed with a concavoconvex pattern corresponding to recorded information, and on the grooves is provided a recording layer 2a formed from a translucent reflective film which has a predetermined reflectance with respect to a reproduction light beam, and a predetermined transmittance within the visible light region. An optical buffer layer 3a of a light transmissive material is provided on the upper surface of the recording layer 2a. Moreover, a printed layer 4a on which is printed visual information such as text and figures is provided on the optical buffer layer 3a. This construction forms a first optical disk 10A. Furthermore in the same manner as the first optical disk 10A, a second optical disk 10B is formed by providing a recording layer 2b, an optical buffer layer 3b and a printed layer 4b on a disk substrate 1b. The first optical disk 10A and the second optical disk 10B are then bonded together using an adhesive 5 with the printed layers 4a, 4b facing each other, thereby forming a double sided recording reproduction type optical disk 10 of the present embodiment.

The disk substrate 1 is formed at a thickness of 0.6 mm by injection molding of a transparent synthetic resin such as a polycarbonate or polyacrylic resin, using a stamper with a surface comprising a concavoconvex pattern which is opposite to the pattern of the recording information.

The recording layer 2 is formed from a translucent reflective film on the concavoconvex pattern of the disk substrate 1, using a sputtering technique or a vacuum deposition method or the like, and with appropriate adjustment of the thickness of the layer, to have a reflectance of 15%~75% relative to the reproduction light beam as well as a transmittance of 10% or above within the visible light region (wavelengths between 380~800 nm). Formation of a translucent reflective film which yields reflectance of 45%~55% relative to the reproduction light beam for the optical disk is particularly preferable. A reflectance of 45% or above ensures that DVD standards are met, thereby ensuring satisfactory reproduction of optical disks using a DVD player. Furthermore, keeping the reflectance of 55% or below ensures good visible definition of the visible information on the printed layer. Preferred materials for the translucent reflective film which forms the recording layer 2 include Au, an alloy incorporating Au, Cu, an alloy incorporating Cu, Si, an alloy incorporating Si as a main component, a compound of Si, and a mixture of Si and compound of Si. Compound of Si with either carbon or nitrogen is particularly preferred as the Si compound.

The optical buffer layer 3 is formed by applying, by means of spin coating techniques or the like, a transparent curable resin, preferably an acrylic based UV curable resin or the like, to achieve a thickness, measured in terms of optical distance, of between 3 μm~45 μm. In those cases where the optical buffer layer 3 is thin, unevenness can develop during formation of the optical buffer layer with the above type of application, whereas if the optical buffer layer 3 is thick, then the curvature of the optical disk itself increases. Consequently, the optical distance should be set within the aforementioned range of 3 μm~45 μm. The optical distance is the value of the physical distance L multiplied by the refractive index n of the material, and is represented by the formula L×n. For example in the case of an acrylic based resin, the value of the refractive index n is approximately n=1.5, and so in such a case the physical distance L would be a thickness of between 2.0 μm~30 μm. Even more preferable thickness values for the optical buffer layer 3 are optical distance values between 5 μm~35 μm. This enables disks to be obtained for which the electrical characteristics and the disk shape are even more stable.

Moreover, the optical buffer layer 3 need not necessarily be transparent, but the imaginary part k of the complex refractive index should preferably satisfy the requirement that k≦1.0, thereby ensuring the visibility of the visible information.

The printed layer 4 can be formed using techniques such as screen printing, offset printing or pad printing. The printed layer 4 may comprise a first printed layer for printing, via mirror image printing for example, visible information such as text or figures in either a single color or multiple colors, and a second printed layer for printing a background color to prevent color mixture with the back surface. By so doing, color mixture between the visible information and the background color can be prevented, and the visibility of the visible information improved. In such cases, if the printing of the second printed layer is carried out to cover the entire printing region with a single color by so-called contact printing, then time and labor for positioning the plate and the like can be eliminated, and the formation of the printed layer 4 becomes simplified, thereby enabling simplification of the process for formation of the printed layer. When the first printed layer is printed in multiple colors, the color arrangement is selected such that the brightness difference between the lightest section and the darkest section on the viewed surface of the printed layer becomes 2.0 or above in the L*a*b* color system. Further, when the design is constituted to include the visible information cooperatively provided by the first and second printed layers, the color arrangement is selected such that the brightness difference between the first printed layer and the second printed layer on the viewed surface becomes 2.0 or above in the L*a*b* color system. Namely, upon viewing the design through the disk substrate formed with pits and through the translucent reflective film (recording layer), the hues represented by the a*b* in the L*a*b* color system are degenerated on the a*b* plane so that the hues appear to be identical to the naked eye. At this time, the viewing of the design solely depends on the difference of L*s indicative of brightness. As such, the design can be discriminated in the optical disk of the present invention, if the L*'s have a difference therebetween equal to or greater than 2.0. If less than 2.0, the contrast is insufficient, so that the discrimination becomes extremely difficult. Note, in the L*a*b* color system, the mark L* represents brightness, while the mark a* represents the chromaticity indicative of hue and the mark b* represents the chromaticity indicative of chroma.

Moreover, the thickness (the thickness measured in terms of physical distance) of both the first printed layer and the second printed layer is preferably within the range 2 μm~30 μm, with values between 3 μm~20 μm being even more preferable. By making the thickness of the first printed layer and the second printed layer 2 μm or above, it can be prevented that the color is seen through the printed layer, thereby making the visible information such as text and figures even more clearly defined. Moreover, by making the thickness of the first printed layer and the second printed layer 30 μm or below, the degree of curvature of the optical disk substrate caused by contraction of the ink for forming the printed layer during curing can be kept to a minimum. Furthermore, if the thickness of the first printed layer exceeds 30 μm, then the irregularities of the first printed layer which displays text and figures and the like, will have an effect on the reproduction signal during readout of the signal information recorded on the recording layer.

Suitable materials for the adhesive 5 include UV curable resins, hot melts, and pressure sensitive adhesive sheets. If a white colored, opaque adhesive is used, then color mixture between the visible information and the back surface can be prevented, meaning that the second printed layer need not be provided in the printed layer 4.

The embodiment of FIG. 1 shows an example of a double sided recording reproduction type optical disk. However, the invention can also be applied to a single sided recording reproduction type optical disk such as a CD, using a substrate of thickness 1.2 mm. Furthermore, even in the case of double sided recording reproduction type optical disks, it is not necessarily a requirement for the first optical disk 10A and the second optical disk 10B to be of the same construction, as in the case shown in FIG. 1, and either one of the optical disks could also be constructed so that visible information is not visible from the signal readout surface side of the disk.

In the aforementioned constitution, the printed colors of the printed layer 4 are selected such that the brightness difference between the lightest section and the darkest section on the viewed surface becomes 2.0 or above, so that the visible information on the printed layer 4 can be assuredly viewed independently of the color of the translucent reflective film. In this way, by numerically expressing the color arrangement of a printed layer which facilitates the reading of the visible information, it is facilitated to select the color arrangement of the printed layer without considering the color of a translucent reflective film material, and the visibility of the visible information is improved.

WORKING EXAMPLES

In order to describe the present invention in further detail, as follows is a presentation of a series of working examples and comparative examples.

Working Example 1

A polycarbonate resin was molded using an injection molding device (M35B-D-DM from Meiki Manufacturing Factory) equipped with a stamper prepared in accordance with information signals, to yield a disk substrate 1a of external diameter 120 mm and thickness 0.6 mm.

A recording layer 2a comprising a translucent reflective film of Au was formed on the signal transfer surface of the disk substrate 1a using a sputtering apparatus (CDI-911 from Balzus Corporation) under conditions of an argon atmosphere, an electrical power input of 0.8 kw, and a sputtering time of 3.0 seconds. Measurement of the reflectance using a DVD evaluation device (DDU-1000 from PulseTech Corporation: reproduction laser wavelength of 650 nm, laser output of 0.3 mW) showed a reflectance of 45%. An acrylic resin (SK5100 from Sony Chemicals Corporation, with optical constants for the readout laser light wavelength of n=1.5, k=0.00) was applied to the top of the recording layer 2a comprising the translucent reflective film using spin coating techniques, and subsequently cured with ultraviolet irradiation, to produce the optical buffer layer 3a with a film thickness of 7 μm (optical distance 10 μm=film thickness×refractive index).

A black colored ultraviolet light curable type ink (Dyecure 582 from Dainihon Inks) was used with a screen printing device to print a mirror image design incorporating both full width and quarter width text characters onto the surface of the optical buffer layer 3a, and the ink was then cured with ultraviolet irradiation, to thereby form a first printed layer. Next, by using a white colored ultraviolet light curable type ink (Dyecure 583 from Dainihon Inks), a layer of contact printing was produced by means of a screen printing device and subsequently cured with ultraviolet irradiation, to thereby form a second printed layer. Thereby, the printed layer 4a is formed, and consequently the first optical disk 10A was obtained. The second optical disk 10B was produced using the same methods.

A holt melt adhesive was applied to the printed layer of each of the first optical disk 10A and the second optical disk 10B, and the disks were then bonded together by bringing the adhesive surfaces together and pressing.

Working Examples 2 through 7

With the exception of changing printed colors, respectively, optical disks were prepared in the same manner as that described for the working example 1.

Working Examples 8, 9

With the exception of varying the sputtering conditions to produce translucent reflective films (recording layers) with reflectance values of 15% and 55% respectively, optical disks were prepared in the same manner as that described for the working example 1.

Working Example 10

With the exception of changing the material of the translucent reflective film to Cu, an optical disk was prepared in the same manner as that described for the working example 1.

Working Examples 11 through 16

With the exception of changing printed colors, respectively, optical disks were prepared in the same manner as that described for the working example 10.

Working Examples 17, 18

With the exception of varying the sputtering conditions to produce translucent reflective films (recording layers) with reflectance values of 15% and 55% respectively, optical disks were prepared in the same manner as that described for the working example 10.

Working Example 19

With the exception of changing the material of the translucent reflective film to Si, an optical disk was prepared in the same manner as that described for the working example 1.

Working Examples 20 through 25

With the exception of changing printed colors, respectively, optical disks were prepared in the same manner as that described for the working example 19.

Working Examples 26, 27

With the exception of varying the sputtering conditions to produce translucent reflective films (recording layers) with reflectance values of 15% and 55% respectively, optical disks were prepared in the same manner as that described for the working example 19.

Working Example 28

An optical disk was prepared in the same manner as that described for the working example 1, except that reactive sputtering was conducted on silicon as a target in an atmosphere of $Ar+CH_4$ and a mixture $(Si+SiC)$ of Si and SiC was adopted as the material of translucent reflective film.

Working Example 29

With the exception of changing printed color, optical disk was prepared in the same manner as that described for the working example 28.

Working Examples 30, 31

With the exception of varying the sputtering conditions to produce translucent reflective films (recording layers) with reflectance values of 15% and 55% respectively, optical disks were prepared in the same manner as that described for the working example 28.

Working Example 32

An optical disk was prepared in the same manner as that described for the working example 1, except that reactive sputtering was conducted on silicon as a target in an atmosphere of $Ar+N_2$ and a mixture $(Si+Si_3N_4)$ of Si and $Si_3N_4$ was adopted as the material of translucent reflective film.

Working Example 33

With the exception of changing printed color, optical disk was prepared in the same manner as that described for the working example 32.

Working Examples 34, 35

With the exception of varying the sputtering conditions to produce translucent reflective films (recording layers) with reflectance values of 15% and 55% respectively, optical disks were prepared in the same manner as that described for the working example 32.

Working Example 36

With the exception of setting the thickness of both a design printed layer formed using a black colored ultraviolet light curable ink, and a contact printed layer formed using a white colored ultraviolet light curable ink, to a physical distance of 10 µm by selecting the mesh size of the screen mesh and by adjusting the thickness of the photosensitizer, an optical disk was prepared in the same manner as that described for the working example 1.

Working Example 37

With the exception of setting the thickness of the design printed layer, formed from a black colored ultraviolet light curable ink, to 30 µm by using repeated application, an optical disk was prepared in the same manner as that described for the working example 36.

Working Example 38

With the exception of using offset printing to form the black design printed layer at a thickness of 2 µm, an optical disk was prepared in the same manner as that described for the working example 36.

Working Example 39

With the exception of setting the thickness of the contact printed layer, formed from a white colored ultraviolet light curable ink, to 30 µm by using repeated application, an optical disk was prepared in the same manner as that described for the working example 36.

Working Example 40

With the exception of using offset printing to form the white contact printed layer at a thickness of 2 µm, an optical

Comparative Examples 1 and 2

With the exception of changing printed colors, respectively, optical disks were prepared in the same manner as that described for the working example 1.

Comparative Examples 3 and 4

With the exception of changing printed colors, respectively, optical disks were prepared in the same manner as that described for the working example 10.

Comparative Examples 5 and 6

With the exception of changing printed colors, respectively, optical disks were prepared in the same manner as that described for the working example 19.

Comparative Examples 7 and 8

With the exception of changing printed colors, respectively, optical disks were prepared in the same manner as that described for the working example 28.

Comparative Examples 9 and 10

With the exception of changing printed colors, respectively, optical disks were prepared in the same manner as that described for the working example 32.

Comparative Example 11

With the exception of setting the thickness of the design printed layer, formed from a black colored ultraviolet light curable ink, to 40 μm by using repeated application, an optical disk was prepared in the same manner as that described for the working example 36.

Comparative Example 12

With the exception of using offset printing to form the black design printed layer at a thickness of 1 μm, an optical disk was prepared in the same manner as that described for the working example 36.

Comparative Example 13

With the exception of setting the thickness of the contact printed layer, formed from a white colored ultraviolet light curable ink, to 40 μm by using repeated application, an optical disk was prepared in the same manner as that described for the working example 36.

Comparative Example 14

With the exception of using offset printing to form the white contact printed layer at a thickness of 1 μm, an optical disk was prepared in the same manner as that described for the working example 36.

Then, the $L^*a^*b^*$ values of the first and second printed layers were measured for the optical disks of each of the working examples 1 through 35 and the comparative examples 1 through 10 by a JIS Z8729 method by means of a spectroscopic color-difference meter of SE-2000 type manufactured by NIPPON DENSHOKU KOGYO, under conditions of D65 light source and visual field of 10° Further, for each of the optical disks, there was obtained an absolute value $|\Delta L^*|$ of the brightness difference between the lightest section and the darkest section on the viewed surface of the printed layer (i.e., the difference between $L^*$'s of the first and second printed layers, in these working examples and comparative examples). Moreover, the visibility of the visible information was evaluated in each of optical disks. The results thereof are shown in Table 1. In this Table, the colors of the printed layers are expressed in the basic color names conforming to JIS Z 8102, and the marks express the colors such that S→black, W→white, Y→yellow, M→magenta, C→cyan blue, R→red, G→green, and B→blue, respectively. Visibility was judged as OK if both the full width text characters and the quarter width text characters were readable, and as NG if not readable.

In Table 1: E1 through E35 are working examples; C1 through C10 are comparative examples; and 1st layer and 2nd layer represent first printed layer and second printed layer, respectively.

TABLE 1

| | Reflective film material | Reflectivity (%) | 1st layer | 2nd layer | 1st printed layer L* | a* | b* | 2nd printed layer L* | a* | b* | Absolute value of ΔL* | Visibility |
|---|---|---|---|---|---|---|---|---|---|---|---|---|
| E1 | Au | 45 | S | W | 43.8 | 8.9 | 33.6 | 51.4 | 2.2 | 30.6 | 7.6 | OK |
| E2 | Au | 45 | S | Y | 43.8 | 8.9 | 33.6 | 50.1 | 4.3 | 45.1 | 6.3 | OK |
| E3 | Au | 45 | M | W | 42.2 | 14.9 | 30.6 | 51.4 | 2.2 | 30.6 | 9.2 | OK |
| E4 | Au | 45 | C | W | 43.0 | 2.3 | 21.6 | 51.4 | 2.2 | 30.6 | 8.4 | OK |
| E5 | Au | 45 | R | W | 45.1 | 16.4 | 36.4 | 51.4 | 2.2 | 30.6 | 6.3 | OK |
| E6 | Au | 45 | G | W | 44.4 | 2.4 | 32.6 | 51.4 | 2.2 | 30.6 | 7.0 | OK |
| E7 | Au | 45 | B | W | 42.6 | 6.3 | 23.3 | 51.4 | 2.2 | 30.6 | 8.8 | OK |
| E8 | Au | 15 | S | W | 30.2 | 4.9 | 15.3 | 65.2 | 1.2 | 17.9 | 35.0 | OK |
| E9 | Au | 55 | S | W | 46.9 | 9.0 | 39.8 | 49.3 | 8.2 | 38.5 | 2.4 | OK |
| E10 | Cu | 45 | S | W | 48.1 | 19.6 | 18.3 | 53.6 | 20.3 | 15.4 | 5.5 | OK |
| E11 | Cu | 45 | S | Y | 48.1 | 19.6 | 18.3 | 52.8 | 13.6 | 30.9 | 4.7 | OK |
| E12 | Cu | 45 | M | W | 48.2 | 25.7 | 18.4 | 53.6 | 20.3 | 15.4 | 5.4 | OK |
| E13 | Cu | 45 | C | W | 48.4 | 10.0 | 10.0 | 53.6 | 20.3 | 15.4 | 5.3 | OK |
| E14 | Cu | 45 | R | W | 51.6 | 27.4 | 31.5 | 53.6 | 20.3 | 15.4 | 2.1 | OK |
| E15 | Cu | 45 | G | W | 48.5 | 8.0 | 19.4 | 53.6 | 20.3 | 15.4 | 5.2 | OK |
| E16 | Cu | 45 | B | W | 46.7 | 13.0 | 10.0 | 53.6 | 20.3 | 15.4 | 7.0 | OK |
| E17 | Cu | 15 | S | W | 30.9 | 9.4 | 8.3 | 64.8 | 10.3 | 11.4 | 33.9 | OK |
| E18 | Cu | 55 | S | W | 49.2 | 22.0 | 25.6 | 51.4 | 21.3 | 24.8 | 2.2 | OK |
| E19 | Si | 45 | S | W | 44.3 | −1.8 | 20.2 | 52.7 | 4.4 | 29.1 | 8.4 | OK |
| E20 | Si | 45 | S | Y | 44.3 | −1.8 | 20.2 | 51.2 | 6.7 | 37.8 | 6.9 | OK |
| E21 | Si | 45 | M | W | 46.8 | 11.5 | 23.0 | 52.7 | 4.4 | 29.1 | 6.0 | OK |

TABLE 1-continued

| | Reflective film material | Reflectivity (%) | 1st layer | 2nd layer | 1st printed layer L* | 1st printed layer a* | 1st printed layer b* | 2nd printed layer L* | 2nd printed layer a* | 2nd printed layer b* | Absolute value of ΔL* | Visibility |
|---|---|---|---|---|---|---|---|---|---|---|---|---|
| E22 | Si | 45 | C | W | 45.6 | −6.4 | 16.0 | 52.7 | 4.4 | 29.1 | 7.1 | OK |
| E23 | Si | 45 | R | W | 48.7 | 9.5 | 24.0 | 52.7 | 4.4 | 29.1 | 4.0 | OK |
| E24 | Si | 45 | G | W | 46.5 | −12.5 | 18.8 | 52.7 | 4.4 | 29.1 | 6.2 | OK |
| E25 | Si | 45 | B | W | 41.5 | −9.5 | 11.0 | 52.7 | 4.4 | 29.1 | 11.2 | OK |
| E26 | Si | 15 | S | W | 29.2 | −0.3 | 5.3 | 65.2 | 1.3 | 18.9 | 36.0 | OK |
| E27 | Si | 55 | S | W | 47.9 | 0.1 | 40.7 | 50.5 | 4.2 | 41.3 | 2.6 | OK |
| E28 | Si + SiC | 45 | S | W | 43.2 | −1.6 | 21.3 | 51.9 | 4.2 | 30.2 | 8.7 | OK |
| E29 | Si + SiC | 45 | S | Y | 43.2 | −1.6 | 21.3 | 50.7 | 6.7 | 38.8 | 7.4 | OK |
| E30 | Si + SiC | 15 | S | W | 29.4 | −0.2 | 5.6 | 66.3 | 1.4 | 17.9 | 37.0 | OK |
| E31 | Si + SiC | 55 | S | W | 47.5 | 0.1 | 40.4 | 50.2 | 5.0 | 41.4 | 2.7 | OK |
| E32 | Si + Si$_3$N$_4$ | 45 | S | W | 45.0 | −1.7 | 20.4 | 52.7 | 4.4 | 29.1 | 7.7 | OK |
| E33 | Si + Si$_3$N$_4$ | 45 | S | Y | 44.3 | −1.8 | 20.2 | 51.2 | 6.7 | 37.8 | 6.9 | OK |
| E34 | Si + Si$_3$N$_4$ | 15 | S | W | 30.0 | −0.4 | 6.3 | 66.1 | 1.4 | 18.0 | 36.1 | OK |
| E35 | Si + Si$_3$N$_4$ | 55 | S | W | 48.0 | 0.1 | 41.7 | 50.5 | 4.2 | 42.1 | 2.5 | OK |
| C1 | Au | 45 | S | R | 43.8 | 8.9 | 33.6 | 45.1 | 16.4 | 36.4 | 1.3 | NG |
| C2 | Au | 45 | Y | W | 50.1 | 4.3 | 45.1 | 51.4 | 2.2 | 30.6 | 1.3 | NG |
| C3 | Cu | 45 | S | C | 48.1 | 19.6 | 18.3 | 48.4 | 10.0 | 10.3 | 0.3 | NG |
| C4 | Cu | 45 | Y | W | 52.8 | 13.6 | 30.9 | 53.6 | 20.3 | 15.4 | 0.9 | NG |
| C5 | Si | 45 | S | C | 44.3 | −1.8 | 20.2 | 45.6 | −6.4 | 16.0 | 1.3 | NG |
| C6 | Si | 45 | Y | W | 51.2 | 6.7 | 37.8 | 52.7 | 4.4 | 29.1 | 1.5 | NG |
| C7 | Si + SiC | 45 | S | C | 43.2 | −1.6 | 21.3 | 45.0 | −6.5 | 15.8 | 1.8 | NG |
| C8 | Si + SiC | 45 | Y | W | 50.7 | 6.7 | 38.8 | 51.9 | 4.2 | 30.2 | 1.3 | NG |
| C9 | Si + Si$_3$N$_4$ | 45 | S | C | 45.0 | −1.7 | 20.4 | 44.9 | −6.5 | 16.1 | 0.2 | NG |
| C10 | Si + Si$_3$N$_4$ | 45 | Y | W | 51.2 | 6.7 | 37.8 | 52.7 | 4.4 | 29.1 | 1.5 | NG |

As apparent from the results of Table 1, the visibility was evaluated as OK for all of the working examples 1 through 35 each of which absolute value |ΔL*| indicative of brightness of the printed layers was 2.0 or above. Contrary, the visibility was evaluated as NG for comparative examples 1 through 10 each of which absolute value |ΔL*| was less than 2.0.

Further the mechanical characteristics (vertical acceleration, and curvature) and the visibility were estimated for the optical disks of the working examples 36 through 40 and the comparative examples 11 through 14.

The mechanical characteristics were measured using a S3DL-3MI device from Adomon Science Corporation, with disks being evaluated as OK if the camber angle in a radial direction was within ±0.8 degrees, and the camber angle in a circumferential direction was within ±0.3 degrees. Disks were also measured using a LM-1200DVD device from Ono Instruments Corporation, with vertical acceleration values of 8 m/s$^2$ or below being evaluated as OK.

The vertical acceleration is an amount which reflects the undulation of the recording surface (recording layer) across the optical disk. Specifically, it denotes the degree of acceleration generated when the pickup for signal reproduction which focused the light beam on the recording surface moves in a direction perpendicular to the recording surface so as to attempt to maintain that focus during rotation of the optical disk. If this value is large, then the pickup is unable to track the undulations in the recording surface, and so the focus is lost and the signal can not be reproduced.

Visibility was judged as OK if both the full width text characters and the quarter width text characters were readable and as NG if not readable.

The results of the evaluation of the mechanical characteristics and the visibility are shown in Table 2.

In Table 2: E36 through E40 are working examples; and C11 through C14 are comparative examples.

TABLE 2

| | Translucent Reflective Film Material | Reflectivity (%) | Optical Distance of Optical Buffer Layer (μm) | Thickness of Design Printed Layer (μm) | Thickness of Contact Printed Layer (μm) | Mechanical Characteristic (Vertical Acceleration) | Mechanical Characteristic (Curvature) | Visibility |
|---|---|---|---|---|---|---|---|---|
| E36 | Au | 45 | 10 | 10 | 10 | OK | OK | OK |
| E37 | Au | 45 | 10 | 30 | 10 | OK | OK | OK |
| E38 | Au | 45 | 10 | 2 | 10 | OK | OK | OK |
| E39 | Au | 45 | 10 | 10 | 30 | OK | OK | OK |
| E40 | Au | 45 | 10 | 10 | 2 | OK | OK | OK |
| C11 | Au | 45 | 10 | 40 | 10 | NG | NG | OK |
| C12 | Au | 45 | 10 | 1 | 10 | OK | OK | NG |
| C13 | Au | 45 | 10 | 10 | 40 | OK | NG | OK |
| C14 | Au | 45 | 10 | 10 | 1 | OK | OK | NG |

As is apparent from the results shown in Table 2, the mechanical characteristics and the visibility were evaluated as OK for all of the working examples 36–40. In the comparative examples 11 and 13, in which the thickness of the printed layer was increased to 40 μm, the visibility was evaluated as OK, but the mechanical characteristics were rated as NG. Particularly in the case of the comparative example 11, in which the thickness of the first printed layer was 40 μm, the vertical acceleration was also rated as NG. In the comparative examples 12 and 14, in which the thickness of the printed layers was reduced to 1 μm, the mechanical characteristics were evaluated as OK, but the visibility was rated as NG.

What I claimed are:

1. An optical disk comprising:
   a transparent disk substrate;
   a recording layer formed from a translucent reflective film layered on pits based on signal information provided on said disk substrate; and
   a printed layer layered on said recording layer and having visible information printed thereon so that said visible information of said printed layer is visible from said disk substrate surface through said recording layer,
   wherein printed colors of said printed layer are selected such that a brightness difference between a lightest section and a darkest section on a surface of said printed layer is 2.0 or above.

2. An optical disk according to claim 1, which has a reflectance of 45%–55% relative to a reproduction light beam.

3. An optical disk according to claim 1, wherein an optical buffer layer formed from a light transmissive material is provided between said recording layer and said printed layer.

4. An optical disk according to claim 1, wherein a material of said recording layer is selected from a group consisting of Au, an alloy incorporating Au and Cu, an alloy incorporating Cu and Si, an alloy incorporating Si as a main component, a compound of Si, and a mixture of Si and compound of Si.

5. An optical disk according to claim 1, wherein said printed layer comprises a first printed layer for printing visible information, and a second printed layer for printing a background color for said visible information.

6. An optical disk according to claim 5, wherein said second printed layer is formed by contact printing of a single color.

7. An optical disk according to claim 5, wherein said first printed layer and said second printed layer each have a thickness of 2 μm–30 μm.

8. An optical disk having a first optical disk unit and a second optical disk unit each having a substrate and bonded together, at least one of the first optical disk unit and the second optical disk unit comprising:
   a transparent disk substrate;
   a recording layer formed from a translucent reflective film layered on pits based on signal information provided on said disk substrate; and
   a printed layer layered on said recording layer and having visible information printed thereon so that and said visible information of said printed layer is visible from said disk substrate surface through said recording layer,
   wherein printed colors of said printed layer are selected such that a brightness difference between a lightest section and a darkest section on a viewed surface of said printed layer is 2.0 or above, and
   said first optical disk unit and said second optical disk unit are bonded together with respective substrate surfaces thereof facing outwards.

9. An optical disk according to claim 8, wherein said first optical disk unit and said second optical disk unit are bonded together by an opaque adhesive layer provided therebetween.

10. An optical disk according to claim 8, wherein both of said first optical disk unit and said second optical disk unit comprise:
    a transparent disk substrate;
    a recording layer formed from a translucent reflective film layered on pits based on signal information provided on said disk substrate; and
    a printed layer layered on said recording layer and having visible information printed thereon so that said visible information of said printed layer is visible from said disk substrate surface through said recording layer,
    wherein printed colors of said printed layer are selected such that a brightness difference between a lightest section and a darkest section on a viewed surface of said printed layer is 2.0 or above, and
    said first optical disk unit and said second optical disk unit are bonded together with respective printed layers facing away from each other.

11. An optical disk according to claim 10, wherein said printed layer of said first optical disk unit and said printed layer of said second optical disk unit are bonded together by an opaque adhesive layer provided therebetween.

12. An optical disk according to claim 8, which has a reflectance of 45%–55% relative to a reproduction light beam.

13. An optical disk according to claim 8, wherein an optical buffer layer formed from a light transmissive material is provided between said recording layer and said printed layer.

14. An optical disk according to claim 8, wherein a material of said recording layer is selected from a group consisting of Au, an alloy incorporating Au, Cu, an alloy incorporating Cu, Si, an alloy incorporating Si as a main component, a compound of Si, and a mixture of Si and compound of Si.

15. An optical disk according to claim 8, wherein said printed layer comprises a first printed layer for printing visible information, and a second printed layer for printing a background color for said visible information.

16. An optical disk according to claim 15, wherein said second printed layer is formed by contact printing of a single color.

17. An optical disk according to claim 15, wherein said first printed layer and said second printed layer each have a thickness of 2 μm–30 μm.

* * * * *